Oct. 23, 1934.  E. WILDHABER  1,977,749
METHOD OF GENERATING TAPERED GEARS
Filed Jan. 28, 1932  2 Sheets-Sheet 1
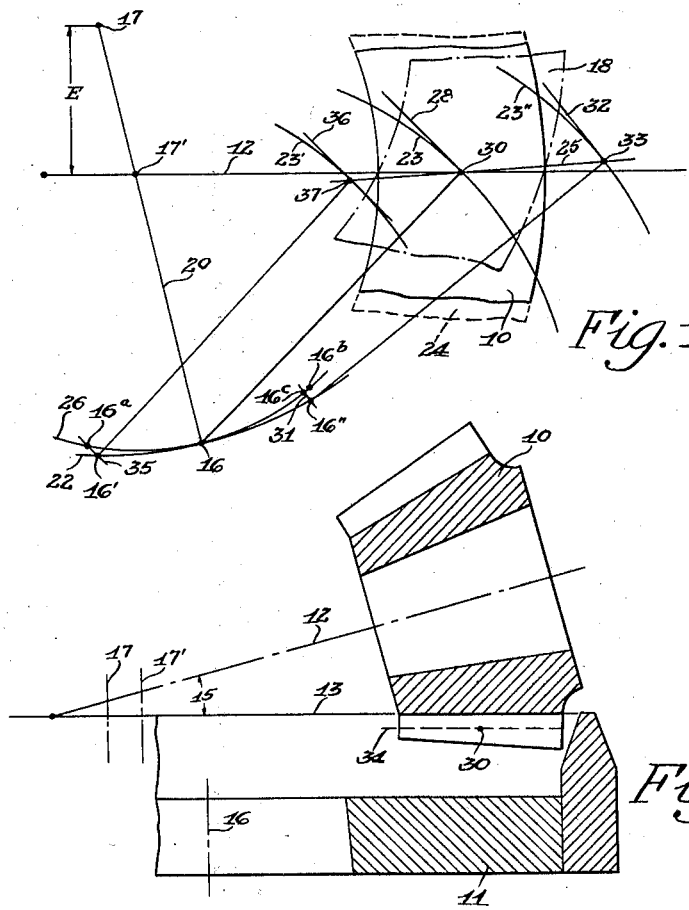
Fig. 1
Fig. 2
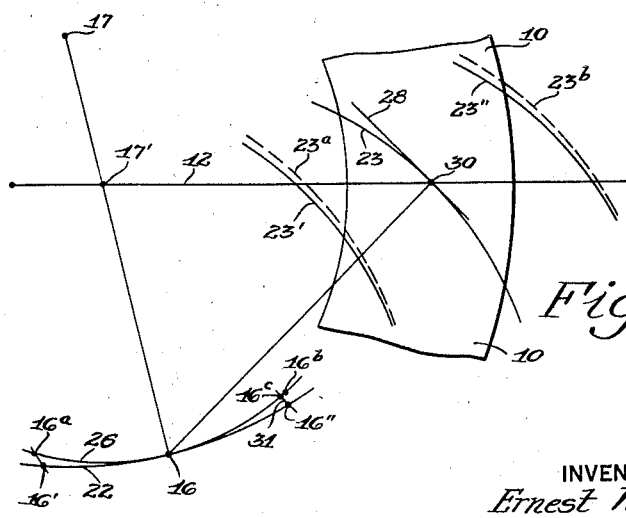
Fig. 3
INVENTOR
Ernest Wildhaber
BY B.F.Schlesinger
his ATTORNEY Oct. 23, 1934.                E. WILDHABER                1,977,749
                     METHOD OF GENERATING TAPERED GEARS
                        Filed Jan. 28, 1932       2 Sheets-Sheet 2
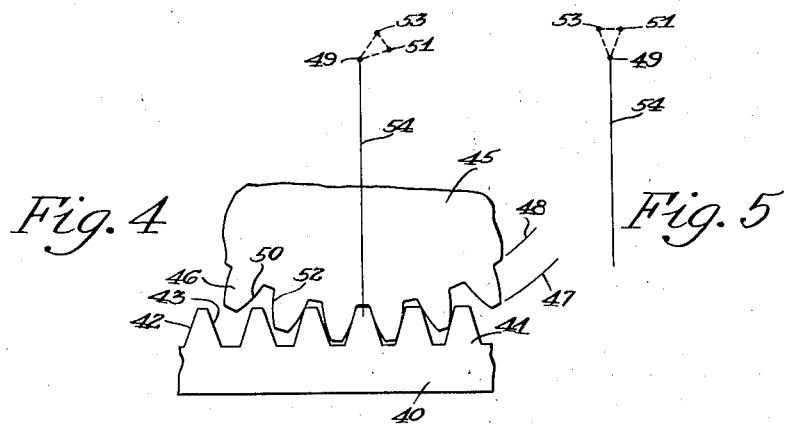
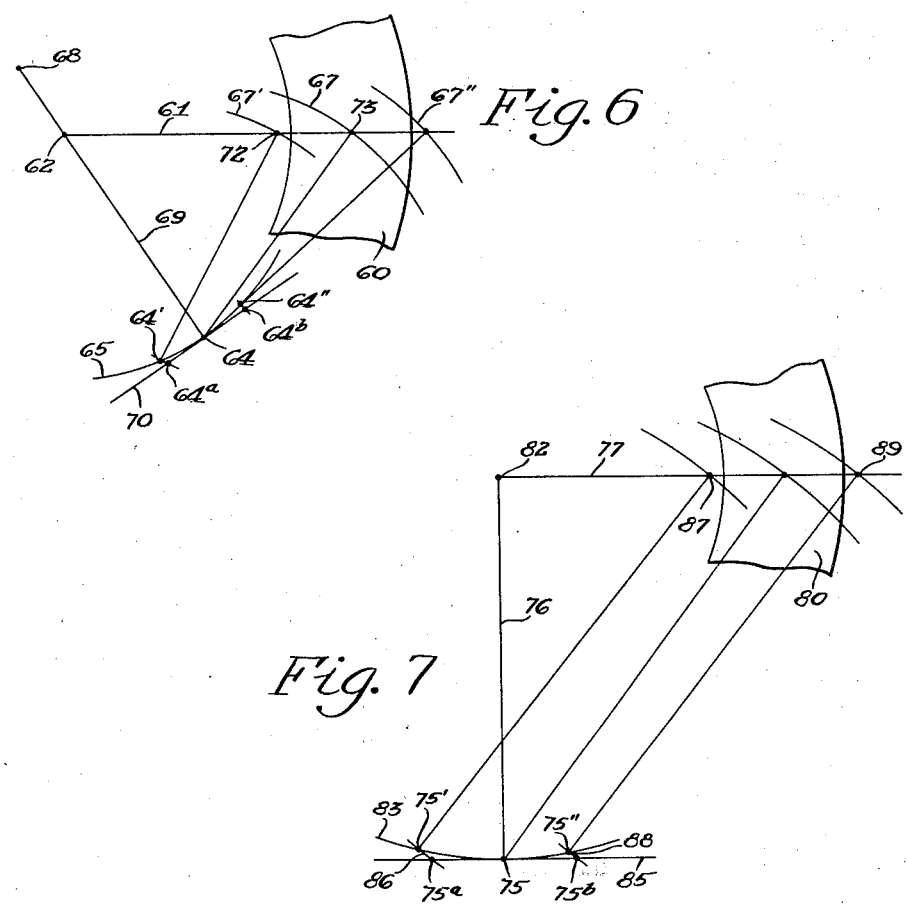
INVENTOR
Ernest Wildhaber
BY
his ATTORNEY Patented Oct. 23, 1934

1,977,749

UNITED STATES PATENT OFFICE 1,977,749

METHOD OF GENERATING TAPERED GEARS

Ernest Wildhaber, Rochester, N. Y., assignor to Gleason Works, Rochester, N. Y., a corporation of New York Application January 28, 1932, Serial No. 589,337

20 Claims. (Cl. 90—4)

The present invention relates to the cutting of bevel and hypoid gears and particularly to the generation of longitudinally curved tooth bevel and hypoid gears.

The purpose of the present invention is to provide a process of generating bevel and hypoid gears which will enable such gears to be cut on machines of cheaper and simpler construction than those heretofore required for this purpose.

In a pair of hypoid gears, the pinion runs in offset position, that is, with its axis offset from the axis of the mate gear. In order to generate hypoid pinions correctly, it has heretofore been considered necessary to cut the pinion in offset position corresponding to the position in which it is to run. The present invention, however, permits of generating hypoid pinions without the usual machine offset and, nevertheless, in such way that the correct lengthwise tooth shape and especially the correct profile curvature will still be obtained. Thus, the present invention enables hypoid pinions to be generated in a manner broadly similar to the present practice of generating bevel pinions and hence, on existing bevel pinion generating machinery. This may be an asset even in finish cutting hypoid pinions, but its principal advantage is in roughing, for a bevel gear rougher is much simpler, cheaper and more rigid than any machine which has been produced or could be built to rough hypoid pinions in offset position.

In a further aspect, the present invention allows of a distinct simplification in bevel gear cutting machinery itself. The present practice is to generate bevel gears by rotating the blank on its axis and simultaneously swinging the tool and blank relative to one another about the axis of an imaginary crown gear or, in some cases, the axis of the mate gear. With the present invention, it is possible to eliminate the swinging motion and use instead a straight-line motion. This permits of building bevel gear and pinion finishers and pinion roughers with a rectilinearly reciprocating slide instead of the usual oscillating cradle and hence the construction of bevel gear generators may be simplified.

As the principles, by which hypoids may be generated according to the present invention on gear cutting machinery, apply equally when the rectilinear motion is used as when the ordinary motion is employed, hypoids, too, may be cut by the process of the present invention with a rectilinear feed motion. In fact, if a bevel gear generator built for practising the present invention with a rectilinear feed motion, is provided with a rotary cutter spindle, as required for a face mill gear cutter, this machine would be capable of more universal use than any type of gear generating machine ever built for it could be used to perform all the operations of a standard universal milling machine in addition to its gear cutting functions.

In the drawings:

Figure 1 is a diagrammatic plan view and Figure 2 a sectional view at right angles to Figure 1, illustrating the principles by which hypoid gears may be correctly generated by the process of the present invention without machine offset;

Figure 3 is a diagrammatic plan view similar to Figure 1, but simplified;

Figure 4 is a fragmentary view showing the tooth structure of a pair of segments such as might be used on existing bevel gear generating machinery to enable the process of the present invention to be practiced thereon in generating hypoid gears;

Figure 5 is a diagrammatic view showing a changed position of some of the basic points illustrated in Figure 4;

Figure 6 is a diagrammatic plan view illustrating how bevel and hypoid gears may be generated according to the present invention with a rectilinear generating motion; and Figure 7 is a diagrammatic plan view similar to Figure 6, illustrating a further simplification possible through the present invention and according to which, bevel and hypoid gears may be generated while employing a straight line motion in the direction of a generatrix of either the pitch or root surface of the blank.

10 designates a hypoid pinion and 11 a face mill gear cutter. The pinion is shown in section in Figure 2 and in a fragmentary development in Figure 1. The cutter 11 may be of standard type such as shown in the U. S. patent to Gleason No. 1,236,834 of August 14, 1917 or of the face-mill hobbing type such as illustrated in the U. S. patent to Gleason et al. No. 1,249,378 of December 11, 1917.

The practice prior to this invention has been to generate a hypoid pinion in an offset position corresponding substantially to the position in which the pinion is to run when in mesh with its mate gear. Ordinarily the hypoid pinion is generated conjugate to a crown gear and the cutter represents the teeth or a tooth surface of the crown gear, and the tooth surfaces of the blank are generated by rotating the cutter in engagement with the blank while rotating the blank on its axis and simultaneously producing a relative motion between the cutter and blank about an axis offset from the axis of the blank and representing the axis of the basic crown gear. Thus, the prior practice has been to position the blank 10 so that its axis 12 is inclined to the plane 13 of the crown gear, represented by the tip surface of the cutter 11, at an angle 15 equal to the root angle of the blank. To generate the tooth surfaces of a blank, the cutter 11 has been rotated on its axis 16 while the blank is rotating on its axis 12 and simultaneously a relative movement is produced between the tool and blank about an axis 17 representing the axis of a crown gear 18 whose center is at 17 and which meshes with the pinion 10. In the drawings, the axis 17 of the crown gear is shown as parallel to the axis 16 of the cutter. In the known practice, the axis 17 is offset from the pinion axis 12 a distance E equal substantially to the offset between the axes of the hypoid pair.

This usual method of generating hypoid pinions requires a special machine provided with means for adjusting the axis of the pinion blank so that it may be offset from the axis of the cradle, which represents the axis of the crown gear. I have discovered, however, that the tooth surfaces of the pinion 10 can be generated with the same high degree of accuracy though the swinging motion takes place about an axis 17′ which intersects the pinion axis 12. This axis 17′ is parallel to the axis 17 and lies on a line 20 which passes through the axis 16 of the cutter at a mean point of the roll between cutter and blank.

In other words, I have found that there exist an infinite number of equivalent crown gears, the axes of which intersect the line 20 (Fig. 1) and from all of which a hypoid pinion 10 can be generated with substantially the same lengthwise tooth shape and profile curvature as if the pinion were generated conjugate to a crown gear whose axis is at 17. In all these cases, except one, namely, when the axis of the crown gear is at 17, the ratio of relative movement of the blank and crown gear must vary during the generating roll or the correct tooth shape will not be produced.

Let us consider what happens when the generating motion takes place about the axis 17′ instead of about the axis 17. When the pinion 10 is generated conjugate to a crown gear 18 whose axis is at 17, the axis 16 of the cutter moves relative to the blank on a circle 22 whose center is at 17. 16′, 16 and 16″ indicate, respectively, the three positions of the cutter axis at the beginning, center and end of the generating roll. The positions taken by the cutting edges of the cutter at these three positions are indicated at 23′, 23 and 23″, respectively. The line of action 25 between the cutter or crown gear and the blank is inclined at a slight angle to the projected axis 12 of the blank, as is well known, and the points of mesh between the crown gear and the blank at different points of the roll lie on this line.

When, on the other hand, the pinion 10 is generated conjugate to a crown gear 24 whose axis is at 17′, the cutter axis moves relative to the blank, on a circle 26 which is tangent to the circle 22 at 16. In other words, the motion of the cutter axis at a mean position of the generating motion is the same whether the cutter be swung about the axis 17 or the axis 17′. Hence, at the center of the roll, the same tooth surfaces will be generated on the pinion blank 10 when the crown gear axis is at 17′ intersecting the axis of the blank as when it is in the offset position 17.

As the cutter swings on the circle 26, it assumes, for instance, the position 16b at one point in the roll. In the known practice of generating hypoid pinions, the swinging motion about the axis 17 is in a constant ratio to the rate of rotation of the blank on its axis 12. If the motion about the axis 17′ were effected at a constant ratio, the arc 16—16b would be exactly equal to the arc 16—16″. In this event, however, the blades of the cutter would be cutting along the line 23b (Fig. 3) when, if the pinion is to duplicate the pinion generated according to the known practice, the cutting blades should be moving along the path 23″. Hence, the cutter cannot be swung at a uniform rate about the axis 17′ and duplicate the tooth surfaces produced in the known generating process when the swing is at a uniform rate about the axis 17. To produce the same tooth surfaces on the blank when swinging about the axis 17′ as when swinging about the axis 17, the swing of the cutter must be at a varying velocity relative to the rotation of the blank. At some point 16c on the arc 26, the cutter will cut a curve substantially identical with the curve 23″ and take a generating cut on the tooth profile substantially the same as that taken by a cutter centered at 16″ in the known process. To generate the desired tooth shape and profile when the cutter is swung about the axis 17′, then, the rate of swing of the cutter must be varied relative to the rotation of the blank if the blank rotates at the same uniform velocity at which it rotates during the known generating process when the swing is about the axis 17.

For positions closely adjacent to the point 16, that is, when the roll is relatively short, the point 16c should be located on a line passing through point 16″ and parallel to the tangent 28 at the mean point 30 of the pinion teeth. Preferably, and especially so when the generating roll required is comparatively long, the position 16c is displaced with reference to the position 16″ along a line 31 parallel to the tooth tangent 32 at the instantaneous point of mesh 33 in the pitch plane 34 of the blank.

The position required for the cutter axis at the other side of the mean position 16, when it is to move along a path relative to the blank corresponding to the path taken by the cutter when at 16′ in the conventional process, is indicated at 16a. The line 35 connecting 16′ to 16a is substantially parallel to the line 36 tangent to the tooth at the instantaneous point of mesh 37. It is evident that the distance 16a—16 is longer than the distance 16—16c. 23′ indicates the position of the tooth curve when the blank is at that point of the roll corresponding to the cutter position 16a. The dotted line 23a has been shown simply to illustrate what would happen were the cutter to be swung about the axis 17′ at a uniform velocity and at a velocity equal to the velocity of swing about the axis 17 in the usual process. In the figures, the distances 16—16′ and 16—16b have been exaggerated to clearly illustrate the principles on which the invention is based.

The varying ratio of movement required by the present process may be produced in the gear cutting machine in various ways. For roughing hypoid gears on existing spiral bevel gear roughing machinery, it is preferable to provide a crown gear and a bevel gear segment with teeth of the required form and position to give the changing ratio described. In principle, cams may also be used as the changing motion may be made up of a uniform motion to which is added, by means of a differential, a changing cam-controlled motion.

Often the changing ratio between the crown gear represented by the tool and the blank may be obtained by means of a standard crown gear and a segment whose tooth sides are eccentrically arranged. In Figure 4, portions of such a crown gear and bevel gear segment are shown in development. The crown gear segment 40 is of standard construction containing teeth 41 which have straight tooth profiles 42 and 43. The bevel gear segment 45 is, however, of special construction. The teeth 46 are arranged between its outside circle 47 and its root circle 48 as in the usual manner. These two circles 47 and 48 have their centers at 49 which, as usual, coincides with the axis of the blank when the segments are in use. The sides of the teeth differ in profile curvature, however, from the sides of the teeth of the segments heretofore used in bevel gear generating machinery. The profile 50 of one side of the segment teeth 46 are involutes or substantially involutes, whose base circle is centered at a point 51 eccentric of the center of rotation 49, instead of at 49 as is the usual method. The position of the point 51 is determined from the considerations above described to give the required change in velocity when the segment 45 is rolling on the segment 40.

In order to obtain the same motion with the other side 52 of the teeth 46 and thereby avoid backlash and jamming in all positions of roll of the two segments, the tooth profiles 52 are preferably made involutes or substantial involutes whose base circle is centered at another point 53 eccentric to the center of rotation 49 and different from the point 51. The point 53 is offset from the center 49 the same amount as the point 51. It can be demonstrated mathematically that the two sides of the involute teeth will produce the same motion, when the radii 49—51 and 49—53 include the same angle with each other as is included between the two sides 42 and 43 of the crown gear teeth. In other words, when, as indicated in Figure 5, the segment 45 is turned to a position where the radii 49—51 and 49—53 are symmetrically disposed with reference to the center line 54, the radii 49—51 and 49—53 should be parallel to the tooth sides 42 and 43, respectively.

Segments constructed as just described, may be used directly on a spiral bevel pinion rougher of the type described in the patent to Bullock et al. No. 1,385,200 of July 1921 and this machine can then be employed to rough hypoid pinions according to the principles of this invention.

Another aspect and further development of the process of this invention is illustrated at Figures 6 and 7 and will now be described. Here reference will be made particularly to the generation of spiral bevel gears and it will be shown how the generation of such gears may be simplified by the present invention.

Figure 6 is a plan view looking at the plane of the crown gear. The developed pitch surface of the spiral bevel pinion blank is indicated at 60. 61 indicates the position of the pinion axis projected into the crown gear plane and 62 designates the pinion apex. In the ordinary process of generating a spiral bevel pinion 60 with a face mill, the axis of the cutter would be swung about the point 62, for the ordinary practice is to generate bevel gears conjugate to a crown gear whose axis intersects the blank axis. Thus the cutter axis would be swung on an arc 65 and different positions of the cutter axis at different points in the generating roll are indicated at 64', 64 and 64'' on this arc. The paths traced by the cutting blades relative to the blank at the three positions of the roll shown, are designated at 67', 67 and 67'', respectively.

It has been pointed out above that the result obtained with the uniform generating roll about the axis 62 can be duplicated approximately when the roll is about some other center such as the center 68 lying on the line 69 which passes through the usual center of roll 62 and the cutter center 64 at the mean point of the roll. The center about which the roll is to take place may be assumed, however, on the line 69 at an infinite distance away from the point 62. In this case, instead of a swinging motion, the generating motion will consist in part of a translation along the straight line 70. This line is perpendicular to the line 69 and tangent to the arc 65 at point 64.

It has already been determined from the analysis with respect to Figures 1 to 3 inclusive, that when the roll is about some other point than the point 62, it is necessary to provide a changing ratio between the translatory movement and the rotation of the blank on its axis. If a straight line motion is used in generating the bevel pinion 60, the required positions of the cutter axis at different points in the roll may be determined in exactly the same manner as these points were determined for the generation of the hypoid pinion in Figures 1 to 3 inclusive. Thus, for the position 64' on the circular path 65, the cutter axis should assume a position 64a to produce a corresponding result when the generating roll includes the rectilinear motion along the line 70. The point 64a lies on a line passing through 64' and parallel to a tangent to the tooth curve at the instantaneous point of mesh 72 between the cutter and the pinion blank. The considered point of mesh 72 lies on the projected pinion axis 61 and the distance 72—64' will equal, of course, the cutter radius 64—73. The line 64'—64a can, for the infinitesimal distances involved, be considered, in fact, as a portion of a circle struck about the point of mesh 72. Another point 64b on a straight line 70 corresponding to position 64'' of the cutter axis on the arc 65 can be determined in the same manner as the position 64a was determined. It will be seen, therefore, that it is possible to generate a spiral bevel gear by rotating the blank on its axis and simultaneously producing a relative translatory motion between the cutter and blank along a straight line, such as the straight line 70 by varying the ratio of the rotational and translatory movements during generation.

The process illustrated in Figure 6 permits of cutting both sides of a tooth space simultaneously on both members of a gear pair when the known relations are observed between the cone distance of the gear pair, the mean spiral angle of the teeth and the diameter of the cutter.

Figure 7 illustrates a further possible simplification of the process of the present invention. Here the cutter diameter and mean spiral angle of the teeth are selected in such a relation to one another that the cutter center 75 in its mean position is disposed on a line 76 perpendicular to the projected axis 77 of the spiral bevel pinion 80 to be generated. If the cutter were swung in the conventional manner about the axis 82 of the basic crown gear, the axis of the cutter would describe a circular path 83, the center of which was at 82. This swinging motion would, like the rotation of the blank, be at a uniform velocity.

Instead of swinging the cutter relative to the blank about an axis 82, however, the cutter may be swung, as indicated above, about some other axis lying on the line 76. Thus, the axis of swing may be at an infinite distance on the line 76 from the axis 82, that is, instead of a swinging motion, rectilinear motion may be used and in this case, the straight line motion would be along the line 85 perpendicular to the line 76 and tangent to the arc 83 at the point 75. The line 85 is parallel to the projected pinion axis 77.

The rate of change in ratio between the translatory motion and the rotary motion of the blank during generation by the modified process of Fig. 7 may be determined according to the principles already set forth. Thus, corresponding positions 75' and 75a or 75'' and 75b of the cutter axis at different points in the roll for the swinging motion and the rectilinear translatory motion, respectively, may be determined. As before, the point 75a will lie on a line 86 passing through the point 75' and parallel to the tangent to the tooth curve at the instantaneous point of mesh 87. Likewise the point 75e will lie on a line 88 parallel to a tangent to the tooth curve being generated at the instantaneous point of mesh 89.

In the modification illustrated in Figure 7, the cutter and blank have a straight line motion relative to one another in the direction of the projected pinion axis while the pinion blank is rotating on its axis. When the pinion blank is adjusted to its root angle for the purpose of generation, the rectilinear motion is in the direction of a straight generatrix of the root cone of the blank and when the blank is adjusted to its pitch angle, the rectilinear motion will be along a straight generatrix of its pitch cone.

The modification illustrated in Figure 7 provides an extremely simple method of generating spiral bevel gears for it eliminates the necessity for an oscillatory cradle in the gear cutting machine and enables a slide having a straight line motion to be used instead. Perhaps the earliest attempts to cut spiral bevel gears were through movement of the cutting tool across the face of the blank along the projection of the blank axis. End mills were used and the curve was produced through continuous rotation of the blank. Even recently, hob-like cutters have been moved in the same direction across the face of a continuously rotating blank in an effort to produce satisfactory spiral bevel gears. All these attempts were unsuccessful because they failed to fulfill the basic conditions required as above described. The cutter should be a face mill or annular grinding wheel or a tool moving in a curved path and the axis of the cutter at the center of the roll should lie on the perpendicular 76 to the projected pinion axis and the ratio between the turning motion of the blank and the rectilinear translation between the tool and blank should not be constant but should change in the manner described. The present invention produces correctly generated tooth profiles whereas in the previous attempts referred to, the tooth profiles were either formed or of only approximate shape as the result of cutting with a formed tool or without a complete generating roll. Both members of a pair of bevel gears may be cut according to the method of the present invention.

It is to be noted that when the terms "tool" or "cutter" are used in the claims they are intended to include grinding or abrasive tools as well as metallic tools. It is to be noted further that while the invention has been described in connection with generating processes where the rolling motion is partly applied to the work and partly to the tool, it is to be understood that the roll may be applied also wholly to the tool or wholly to the work as with previous methods and that the term "relative" as used in the claims is intended to cover these possibilities.

Gears may be cut according to the present invention either "parallel depth", that is, with teeth of the same height throughout their length, or "tapering depth", that is, with teeth tapering in height from their outer to their inner ends, as in the known processes.

While the invention has been described particularly with reference to the cutting of longitudinally curved tooth tapered gears, it will be understood that the principles apply, also, to the manufacture of straight tapered gears. Here the radius of the tools may be considered as infinite and the varying ratio of the movement constituting the generating roll calculated accordingly. In general, it may be said that while I have described certain particular embodiments of my invention, the invention is capable of further modification and use and this application is intended to cover any variations, uses or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating the tooth surfaces of a longitudinally curved tooth tapered gear which comprises moving a cutting tool in a longitudinally curved path across the face of a gear blank while rotating the blank on its axis and simultaneously producing an additional relative translatory movement between the tool and blank, the ratio of the last two movements being varied during generation.

2. The method of generating the tooth surfaces of a longitudinally curved tooth tapered gear which comprises moving a cutting tool in a longitudinally curved path across the face of a gear blank while rotating the blank on its axis and simultaneously producing a rotational movement between the tool and blank about an axis angularly disposed to the blank axis, the ratio of the last two movements being varied during generation.

3. The method of generating the tooth surfaces of a longitudinally curved tooth bevel pinion which comprises moving a cutting tool in a longitudinally curved path across the face of the blank while rotating the blank on its axis and simultaneously producing an additional rotational movement between the tool and blank about an axis angularly disposed to and offset from the blank axis, the ratio of the two last movements being varied during generation.

4. The method of generating the tooth surfaces of a hypoid pinion which comprises moving a cutting tool in a longitudinally curved path across the face of the blank while rotating the blank on its axis and simultaneously producing an additional rotational movement between the tool and blank about an axis intersecting the blank axis, the ratio of the two last named movements being varied during generation.

5. The method of generating the tooth surfaces of a tapered gear which comprises imparting a cutting motion to a tool, while rotating the blank on its axis and simultaneously producing a rectilinear relative movement between the tool and blank, the ratio of the rectilinear movement to the rotation of the blank being varied during generation.

6. The method of generating the tooth surfaces of a bevel gear which comprises imparting a cutting motion to a tool while rotating the blank on its axis and simultaneously producing an additional rotational movement between the tool and blank about an axis angularly disposed to and offset from the blank axis, the ratio of the last two movements being varied during generation.

7. The method of generating the tooth surfaces of a hypoid gear which comprises imparting a cutting motion to a tool while rotating the blank on its axis and simultaneously producing an additional rotational movement between the tool and blank about an axis angularly disposed to and offset from the blank axis, the ratio of the last two movements being varied during generation.

8. The method of generating the tooth surfaces of a tapered gear which comprises moving a cutting tool in a longitudinally curved path across the face of a tapered gear blank, while rotating the blank on its axis and simultaneously producing a relative rectilinear movement between the tool and blank, the ratio of the rectilinear movement to the rotation of the blank being varied during generation.

9. The method of generating the tooth surfaces of a tapered gear which comprises moving a cutting tool in a longitudinally curved path across the face of a tapered gear blank while producing a relative rolling movement between the tool and blank, said rolling movement comprising rotation of the blank on its axis and a simultaneous relative rectilinear movement between the tool and blank in the direction of a cone element of the blank, the ratio of the rotational and rectilinear motions being varied during generation and the spiral angle of the blank and distance of the tool from its center of curvilinear movement being so selected that at a mean point of the roll, the center lies on a line perpendicular to the axis of the gear projected into the plane of roll.

10. The method of generating the tooth surfaces of a tapered gear which comprises imparting a cutting motion to a tool while rotating the blank on its axis and simultaneously producing an additional relative movement between the tool and blank about an axis angularly disposed to the blank axis and whose distance from the blank axis is different from the distance between the axis of the gear being generated and its mate gear when the two are in mesh, the ratio of the two rotational movements being varied during generation.

11. A pair of meshing segments, one of which is rotatable and has tooth surfaces whose opposite side tooth profiles are, respectively, involutes of base circles offset equal distances from the axis of said segment.

12. A pair of meshing segments comprising a crown gear segment and a bevel gear segment, said crown gear segment having teeth of straight profile and said bevel gear segment having opposite side tooth surfaces whose profiles are involutes of different base circles whose centers are offset from the axis of said segment and from one another.

13. The method of generating the tooth surfaces of a tapered gear with a rotary face-mill gear cutter which comprises selecting the mean spiral angle of the teeth of the gear and the diameter of the cutter so that at a mean position of the generating roll, the axis of the cutter lies on a line perpendicular to the axis of the blank projected into a plane tangent to the pitch surface of the blank, and rotating the cutter in engagement with the blank while rotating the blank on its axis and producing a relative translatory movement between the cutter and blank in the direction of the projected blank axis, the ratio of said translatory movement to the rotation of the blank being varied during generation to generate tooth surfaces on the blank of the desired profile curvature and lengthwise shape.

14. The method of generating the tooth surfaces of a hypoid pinion which comprises rotating a face mill gear cutter in engagement with the blank while rotating the blank on its axis and simultaneously producing a relative movement between the cutter and blank about an axis parallel to the cutter axis and intersecting the blank axis, the ratio of the two last rotational movements being varied continuously during generation.

15. The method of generating the tooth surfaces of a bevel pinion which comprises rotating a face-mill gear cutter in engagement with the blank while rotating the blank on its axis and simultaneously producing a relative motion between the cutter and blank about an axis parallel to the axis of the cutter and offset from the blank axis, the ratio of the two last named movements being varied continuously during generation.

16. The method of generating the tooth surfaces of a tapered gear which comprises rotating a face-mill gear cutter in engagement with the blank while rotating the blank on its axis and simultaneously producing a relative rectilinear translatory movement between the cutter and blank in a direction perpendicular to the cutter axis, the ratio of the last named translatory movement to the rotational movement of the blank being varied continuously during generation.

17. The method of generating tooth surfaces of tapered gears capable of transmitting uniform motion, which comprises moving a tool across the face of a gear blank while rotating the blank on its axis and simultaneously producing an additional relative motion between the tool and blank, said additional relative motion being in a plane tangent to the root surface of the blank and being effected at a varying ratio with respect to said rotation of the blank.

18. The method of generating the tooth surfaces of a tapered gear which comprises rotating a face-mill gear cutter in engagement with a tapered gear blank while rotating the blank on its axis and simultaneously producing a rectilinear translatory movement between the cutter and blank, the ratio of the rectilinear movement to the rotation of the blank being varied during generation.

19. The method of generating the tooth surfaces of a tapered gear which comprises moving a tool in a longitudinally curved path across the face of a gear blank while producing a relative rolling movement between the tool and blank, said rolling movement comprising rotation of the blank on its axis and a simultaneous relative movement between the tool and blank about an axis angularly disposed to the blank axis, the tool being so moved during said rolling movement that at different points in the roll, the position of the centers, about which the curvilinear movement of the tool takes place, are different from what they would be were the cutter swung at a uniform velocity about the second-named axis.

20. The method of generating the tooth surfaces of a tapered gear which comprises rotating a face mill gear cutter in engagement with a gear blank while producing a relative rolling movement between the cutter and blank about an axis intersecting the axis of the blank, the cutter being so moved during said rolling movement that at different points in the roll, the positions of the cutter centers are different from what they would be were the cutter swung at a uniform velocity about the first-named axis.

ERNEST WILDHABER.